(12) United States Patent
Sato et al.

(10) Patent No.: US 8,305,449 B2
(45) Date of Patent: Nov. 6, 2012

(54) APPARATUS FOR DETECTING FOCUS

(75) Inventors: Koichi Sato, Saitama (JP); Yutaka Takakubo, Saitama (JP); Kazuo Sugitani, Saitama (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 182 days.

(21) Appl. No.: 12/822,383

(22) Filed: Jun. 24, 2010

(65) Prior Publication Data

US 2010/0328521 A1    Dec. 30, 2010

(30) Foreign Application Priority Data

Jun. 25, 2009    (JP) .................................. 2009-150890

(51) Int. Cl.
*H04N 5/33*   (2006.01)
*H04N 5/228*  (2006.01)

(52) U.S. Cl. ..................... 348/166; 348/208.12; 348/145

(58) Field of Classification Search ............. 348/208.12, 348/326, 345, 145, 166, E3.027
See application file for complete search history.

(56) References Cited

U.S. PATENT DOCUMENTS

| | | | |
|---|---|---|---|
| 6,445,883 B1 * | 9/2002 | Hamada | ........................... 396/96 |
| 7,102,675 B1 | 9/2006 | Tokunaga | |
| 7,460,779 B2 | 12/2008 | Nakata | |
| 7,493,034 B2 | 2/2009 | Nakata | |
| 7,502,065 B2 | 3/2009 | Nakahara | |
| 7,515,201 B2 | 4/2009 | Nakahara | |
| 7,515,819 B2 * | 4/2009 | Takahashi | ...................... 396/121 |
| 7,526,192 B2 | 4/2009 | Nakahara | |
| 7,589,764 B2 | 9/2009 | Nakata et al. | |
| 7,657,169 B2 | 2/2010 | Nakahara | |
| 7,701,502 B2 * | 4/2010 | Ozawa et al. | .................. 348/350 |
| 2006/0104622 A1 * | 5/2006 | Nakata | ............................ 396/96 |
| 2008/0100738 A1 * | 5/2008 | Tsuchiya et al. | .............. 348/345 |
| 2008/0285966 A1 | 11/2008 | Kanai | |
| 2010/0060779 A1 * | 3/2010 | Yoshida | ........................ 348/345 |

FOREIGN PATENT DOCUMENTS

| | | |
|---|---|---|
| JP | 11-205694 | 7/1999 |
| JP | 2006-145792 | 6/2006 |

OTHER PUBLICATIONS

U.S. Appl. No. 12/834,159 to Moriyasu Kanai, filed Jul. 12, 2010.
Koichi Sato et al., "Apparatus for Detecting Focus", U.S. Appl. No. 12/836,847, filed Jul. 15, 2010, , PP.

* cited by examiner

*Primary Examiner* — Hung Lam
(74) *Attorney, Agent, or Firm* — Greenblum & Bernstein, P.L.C.

(57) ABSTRACT

An apparatus for detecting a focus state has an optical image-forming system that forms an object image, a plurality of line sensors that is arranged on a projected area of the optical image-forming system; a plurality of monitor sensors that is arranged on the projected area along the direction of a line-sensor array, each monitor sensor being adjacent to a corresponding line sensor and monitoring an amount of light incident on the corresponding line sensor; and a signal processor that outputs image-pixel signals corresponding to the object image on the basis of electric charges accumulated in the plurality of line sensors. At least an endmost monitor sensor corresponding to an endmost line sensor is arranged on the center-facing side of the endmost line sensor.

20 Claims, 8 Drawing Sheets

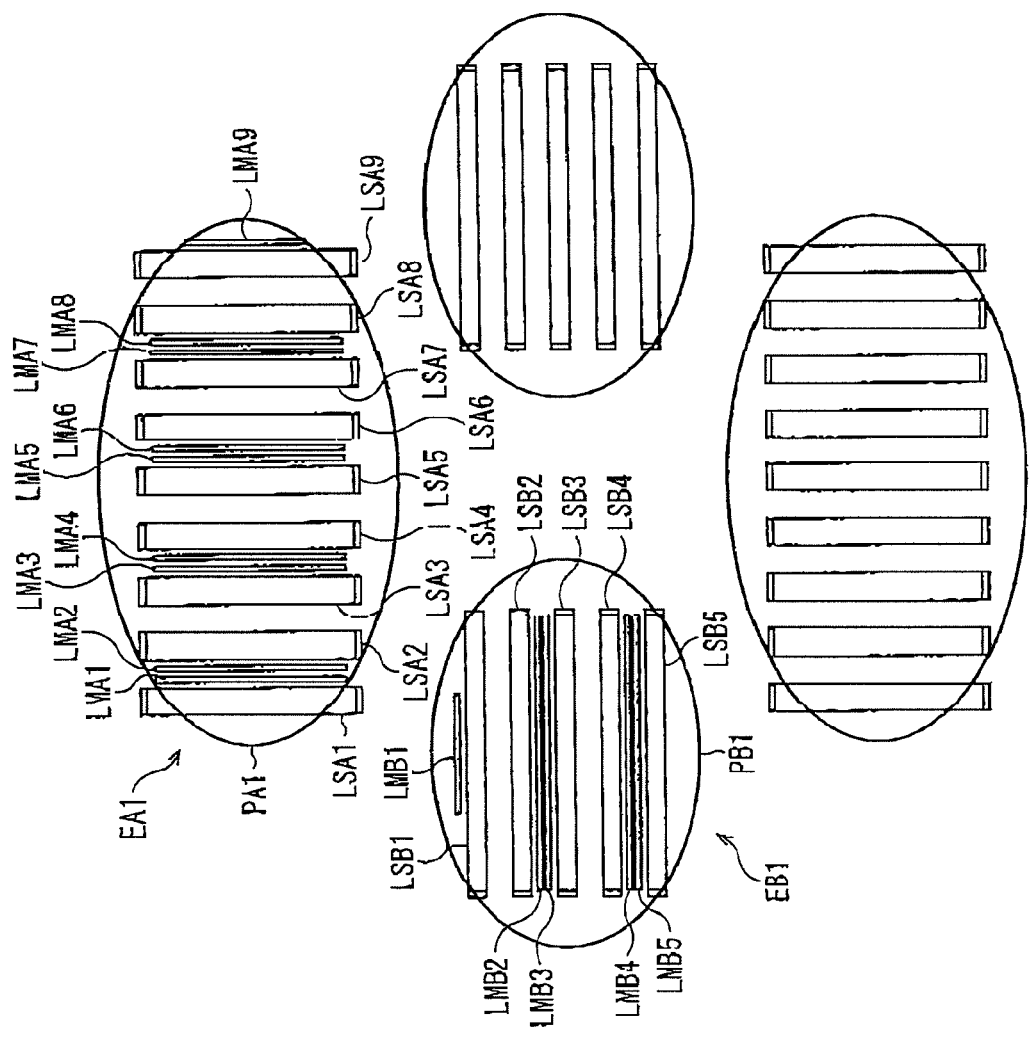

APPARATUS FOR DETECTING FOCUS

BACKGROUND OF THE INVENTION

1. Field of the Invention

The present invention relates to a camera with an AF (Auto Focus) mechanism using a phase-difference method, such as a SRL (Single Reflex Lens) camera. In particular, it relates to an arrangement of AF sensors.

2. Description of the Related Art

An SRL-type camera is equipped with an AF mechanism based on a phase-difference method, which has an optical image-forming system and a sensor module that is constructed from a focus-detection device, such as an IC chip. The optical image-forming system has a separator lens and a condenser lens, whereas the focus-detection device is equipped with a series of line sensors that are arrayed within a projected area of the optical system.

In U.S. Pat. No. 7,493,034, as AF sensor in which a plurality of pairs of line-sensors is arrayed in a projected area is disclosed. An optical system divides a ray bundle from an object into two ray bundles to project a pair of images onto the pairs of line-sensors. Each line-sensor outputs image-pixel signals by photoelectric conversion, and a difference between the positions of the two images, namely a phase difference, is detected. The difference represents an out-of-focus magnitude. Whether or not an object is in focus can be determined by the detected out-of-focus magnitude. When the object in out of focus, an amount of movement by the focusing lens and a shift in its direction are determined. Then, the focusing lens is driven.

Generally, a line sensor is an electric charge storage or accumulation-type sensor, and an accumulation period is adjusted by a monitor sensor that is arrayed alongside the line sensor. For example, as disclosed in U.S. Pat. No. 7,102,675, a monitor sensor consistently detects the intensity of light and outputs monitor signals in order to prevent the target line sensor from receiving a quantity of light exceeding a dynamic range, which would cause electric charges to overflow from the line sensor. The amount of light that each line sensor receives varies according to the brightness distribution of an object. Therefore, a charge-accumulation period is controlled independently for each line sensor. When a monitor signal exceeds a predetermined threshold value, a corresponding line sensor stops the accumulation of electric charges, and accumulated electric charges are temporarily stored in a memory of the line sensor. After the accumulation of electric charges is completed by all of the line sensors, a series of image-pixel signals are output from the line sensors to an AF controller.

Light passing through the optical image-forming system does not sufficiently reach the peripheral region of the projected area due to optical characteristics such ac a decrease in light and vignetting. Therefore, a monitor sensor monitoring a peripheral line sensor positioned near the boundary of the projected area cannot precisely detect the quantity of light reaching the peripheral line sensor.

SUMMARY OF THE INVENTION

An object of the present invention is to provide a focus-detection device that is capable of precisely detecting a focus state while effectively utilizing a projected area as much as possible.

The present invention is intended for use in an apparatus that detects a focus state. The apparatus has an optical image-forming system that forms an object image with a plurality of line sensors arranged on a projected area of the optical image-forming system; a plurality of monitor sensors arranged on the projected area along the direction of a line-sensor array with each monitor sensor positioned adjacent to a corresponding line sensor and monitoring the quantity of light incident on the corresponding line sensor; and a signal processor that outputs image-pixel signals corresponding to the object image on the basis of electric charges accumulated in the plurality of line sensors. Then, at minimum an endmost monitor sensor corresponding to an endmost line-sensor is arranged along the center-facing side of the endmost line sensor.

An apparatus for detecting a focus state according to another aspect of the present invention has an optical image-forming system that forms an object image; a plurality of line sensors arranged on a projected area of the optical image-forming system; a plurality of monitor sensors that is arranged on the projected area along the direction of a line-sensor array with each monitor sensor positioned adjacent to a corresponding line sensor and monitoring a quantity of light incident on the corresponding line sensor; and a signal output processor that outputs image-pixel signals corresponding to the object image on the basis of electric charges accumulated in the plurality of line sensors. Then, at minimum an endmost monitor sensor corresponding to an endmost line-sensor is smaller than a center monitor sensor positioned in the central portion of the projected area.

BRIEF DESCRIPTION OF THE DRAWINGS

The present invention will be better understood from the description of the preferred embodiment of the invention set forth below together with the accompanying drawings, in which:

FIG. 8 is a schematic of an arrangement of line-sensors and monitor sensors according to the sixth embodiment.

DESCRIPTION OF THE PREFERRED EMBODIMENTS

Hereinafter, the preferred embodiments of the present invention are described with reference to the attached drawings.

Figure 1:
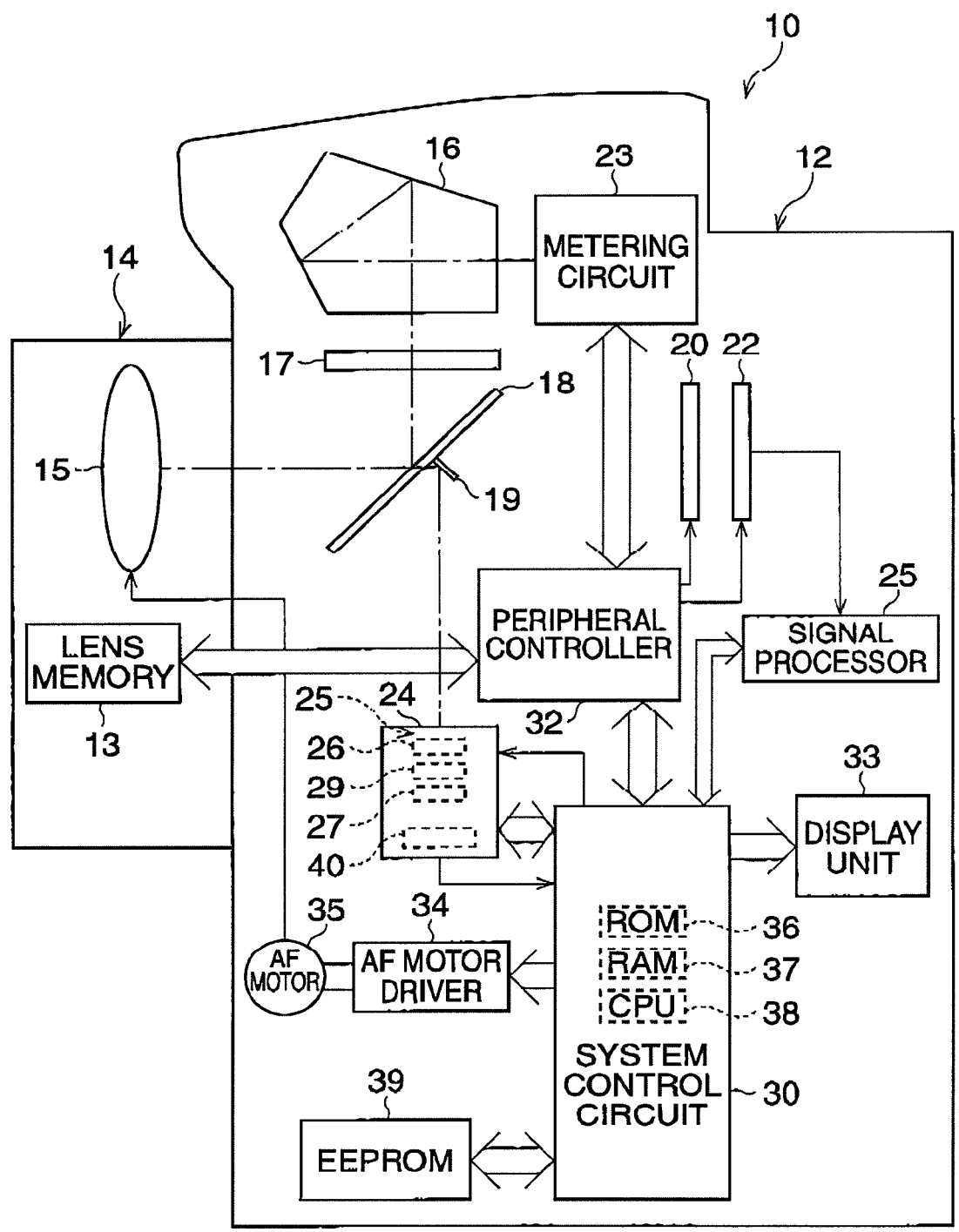
FIG. 1 is a schematic of the inner construction of a digital camera according to the first embodiment.

FIG. 1 is a schematic of the inner construction of a digital camera according to the first embodiment.

The SLR-type digital camera 10 is equipped with a body 12 and an interchangeable lens 14 removably attached to the body 12. The body 12 has a pentaprism 16, a quick return mirror 18, a focal plane shutter 20, and an image sensor 22 (e.g., a CCD).

A metering circuit 23 is arranged adjacent to the pentaprism 16, and detects the brightness of an object image formed by a pint glass 17 disposed above the quick return mirror 18, in accordance with a TTL metering method. An AF module 24, which in disposed below the quick return mirror 18, detects a focus state in accordance with a phase-difference method.

A system control circuit 30 having a ROM unit 36, a RAM unit 37, and a CPU 38 controls the operation of the camera 10 and outputs control signals to the metering circuit 23, the AF module 24, a peripheral controller 32, a display unit 34, and EEPROM 39, etc. The peripheral controller 32 controls an exposure mechanism including the focal plane shutter 20, an iris (not shown), and the image sensor 22. Also, the peripheral controller 32 obtains lens information from a lens memory 13 in the interchangeable lens 14.

When the camera 10 is turned ON a photographing mode is activated. Light passing through a photographing optical system 15 is directed to the pentaprism 16 via the quick return mirror 18. A user confirms an object through a viewfinder (not shown). When a release button (not shown) is depressed halfway, the metering circuit 23 detects the brightness of the object image and the AF module 24 detects a focus state.

A portion of the light passing through the photographing optical system 15 passes through the quick return mirror 18 and proceeds to the AM module 24 via a sub-mirror 19. The AF module 24 has an optical image-forming system 25 including a condenser lens 26, a separator lens 27, a separator mask 29, and a focus detector 40. The separator mask 29 is arranged on a conjugate surface equivalent to an image-forming surface (i.e., a photo-receiving surface of the image sensor 12), and divides an object image into two pairs of images. The separator lens 27 forms the two pairs of images on a photo-receiving surface of the AF module 24. Herein, the two pairs of images are perpendicular to each other. The focus detector 40 outputs image signals for the projected object images to the system control circuit 30.

The system control circuit 30 calculates an out-of-focus magnitude and carries out a focus-adjustment process. Concretely, the system control circuit 30 outputs control signals to an AF motor driver 34 based on the out-of-focus magnitude and out-of-focus direction. The AF motor 35 repositions a focusing lens in the photographing optical system 15 on the basis of driving signals supplied by the AF motor driver 34. The focus detection and lens drive processes are both carried out until an object image is in focus.

After the AF adjustment and brightness detection processes are carried out, the system control circuit 30 calculates exposure values, i.e., a shutter speed and an F number. When the release button is fully depressed, a series of recording processes are carried out. Namely, an object target image is formed on the imago sensor 22 by the motions of the quick return mirror 18, the iris and the shutter 20, and then one frame's worth of image-pixel signals are read from the image sensor 22. A signal processor 25 generates digital image data from the read image-pixel signals. The generated image data is stored in a memory (not shown) such as a memory card.

Figure 2:
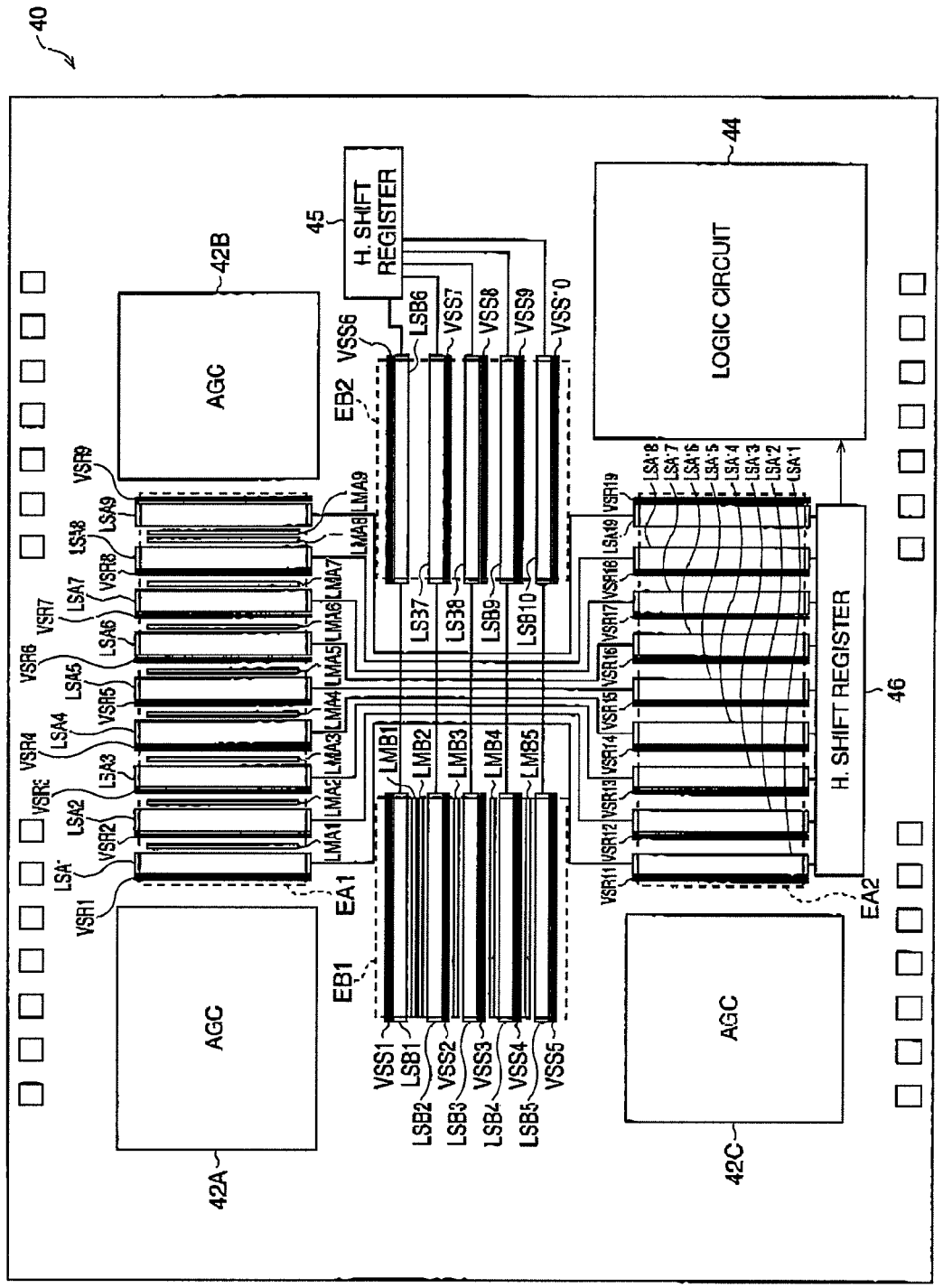
FIG. 2 is a block diagram of the focus detector.

FIG. 2 is a block diagram of the focus detector.

The focus detector 40 is constructed from an IC (Integrated Circuit) chip on which a plurality of CMOS-type line sensors is arranged. On the surface of the focus detector 40, a pair of line-sensor groups EA1 and EA2 is disposed so as to be opposite from each other along a vertical direction of the photo-receiving surface, and a pair of line-sensor groups EB1 and EB2 is disposed so as to be opposite from each other along a horizontal direction. Note that the vertical direction corresponds to the vertical direction of the photographed object image, and the horizontal direction corresponds to the horizontal direction of the object image. The line-sensor groups EA1 and EA2 and the line-sensor groups EB1 and EB2 are sandwiched around the center portion of the detector surface.

One pair of object images obtained from pupil division by the optical image-forming system 25 is projected onto the areas in which the line-sensor groups EA1 and EA2 are disposed, and the other pair of object images is projected onto areas in which the line-sensor groups EB1 and E32 are disposed.

Each line-sensor group is composed of a plurality of line sensors arrayed along the horizontal (left-right) direction or vertical (upper-lower) direction at predetermined intervals. The line-sensor groups EA1 and EA2 are arrayed along the left-right direction, whereas line-sensor groups EB1 and EB2 are arrayed along the upper-lower direction. Each line-sensor is constructed from a plurality of photo-converters (herein, photodiodes) arrayed in a line.

The line-sensor group EA1 is composed of nine line sensors LSA1-LSA9, with each line sensor functioning as a standard line sensor. On the other hand, each one of the nine line sensors LSA11-LSA19 in the line-sensor group EA2 functions as a reference line sensor. Similarly, each one of the five line sensors from LSB1 to LSB5 functions as a standard line sensor, while each one of the five line sensors from LSB6 to LSB10 functions as a reference line sensor.

For the line-sensor groups EA1 and E331, monitor sensors from LMA1 to LMA9 and from LMB1 to LMB5 are disposed alongside the line sensors from LSA1 to LSA9 and from LSB1 to LSB5, respectively. Each monitor sensor is composed of a plurality of photodiodes that divides the area of the neighboring line sensor into multiple sections. Each of the monitor sensors from LMA1 to LMA9 extends along the longitudinal direction, namely, alongside the neighboring line sensor, and outputs a "monitor signal" representing a quantity of light (intensity of light). Similarly, earth monitor sensor from LMB1 to LMB5 also outputs a monitor signal.

Furthermore, vertical shift registers VSR1-VSR9 and VSS1-VSS5 are arranged adjacent to line sensors LSA1-LSA9 and LSB1-LSB5, respectively. Similarly, vertical shift registers VSR11-VSR19 and VSS6-VSS10 are arranged adjacent to line sensors LSA11-LSA19 and LSB6-LSB10, respectively. Then, a series of black level monitoring sensors (not, shown) are arranged adjacent to the line sensors in line-sensor groups EA1 and EB1.

Each one of the three AGC (Auto Gain Control) circuits 42A-42C compares the values of the monitor signals received from the monitor sensors with a threshold value. Each AGC circuit determines whether a quantity of light incident on a target line sensor is sufficient for detecting a focus state. The threshold value is predetermined so as to prevent an overflow of light exceeding the dynamic range of a line sensor.

When the monitor signal exceeds the threshold value, the quantity of light incident on it is determined to be sufficient for detecting the focus state. Consequently, the accumulation of an electric charge by a target line sensor stops and the accumulated electric charges are temporarily stored in the line sensor.

A charge storage period for each line sensor is independently controlled, namely, individually adjusted in accordance with the distribution of the light intensity of an object. When the accumulation of electric charges is complete for all of the line sensors, image-pixel signals are output to the system control circuit 30 via an output circuit (not shown) by the vertical shift registers VSR1-VSR9, VSR11-VSR19, VSS1-VSS5, VSS6-VSS10 and horizontal shift registers 45,

46. In the system control circuit 30, an out-of-focus magnitude is obtained from the phase difference of the image-pixel signals.

A logic circuit 44 controls the AGC circuits 42A to 42C, vertical shift registers VSR1-VSR9 VSR11-VSR19, VSS1-VSS5, VSS6-VSS10, and horizontal shift registers 45, 46. Furthermore, the logic circuit 44 sets a threshold level associated with the monitor signal and sets an offset value based on a black level of the monitor sensors.

Figure 3:
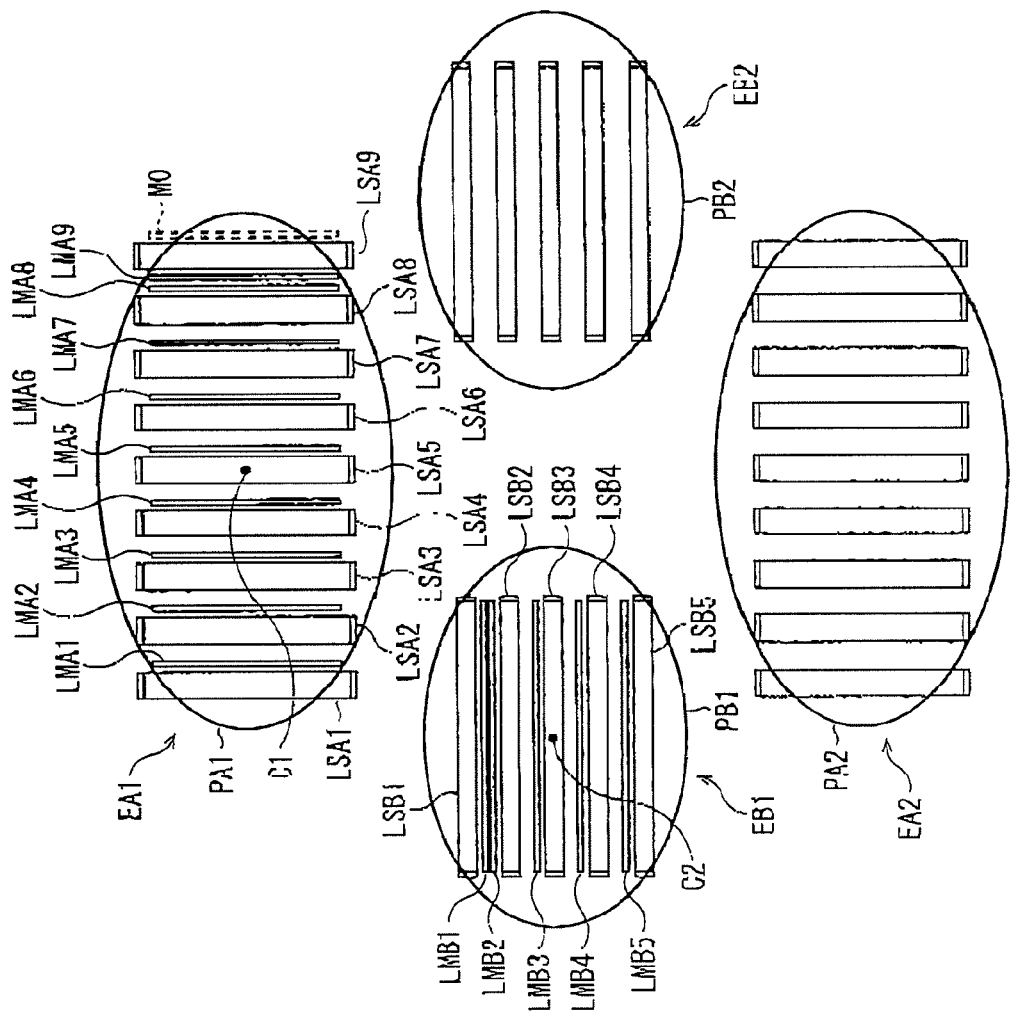
FIG. 3 is a schematic of an arrangement of the monitor sensors.

FIG. 3 is a schematic arrangement of the monitor sensors. Hereinafter other circuits and devices associated with the focus-detection process are omitted.

As described above, two pairs of object images are formed on the focus detector 40. One pair of object images is formed on projected areas PA1 and PA2, while the other pair of object images is formed on projected areas P31 and P82. The also and outline form of each projected area depends upon the characteristics of the optical image-forming system 25. Herein, each projected area is elliptical. In the line-sensor group EA1, the nine line sensors from EA1 to EA9 are arrayed across the entire projected area EP1 to utilize the width of the projected area PA1 as much as possible. Consequently, parts of line-sensors LSA1 and LSA9 extend outside of the projected area PA1. Similarly, parts of line-sensors LSB1 and LSB5 extend outside of the projected area PB1.

On the other hand, both of the endmost monitor sensors LMA1 and LMA9, which monitor line sensors LSA1 and LSA9, are arranged so as to be within the projected area PA1. Concretely, the monitor sensor LMA9 is arranged along the inner side of the line sensor LSA9, which is the side facing the center point C1 of the projected area PA1. Similarly, the outermost monitor sensor LMB1 is arranged at the inner side of the line sensor LSB1 that is facing the center point C2 of the projected area PB1.

Monitor sensors LMA1-LMA8 are provided on the right side of line sensors LSA1-LSA8, respectively, whereas only monitor sensor LM9 is arranged at the left side of line sensor LSA9. Namely, the monitor sensor is arranged along the side that faces the center point C1 of the projected area PA1 (hereinafter, called a "center-facing side"). In FIG. 3, an imaginary position of a monitor sensor that is arranged at the right side of line sensor LSA9 is illustrated by a broken line. As can be seen from the position of the monitor sensor LMA9 and the imaginary position, the entire monitor sensor LMA9 is within the projected area PA1, which is different from the imaginary position. Similarly, all of monitor sensor LMB1 is within the projected area PA2.

In this manner, in the present embodiment monitor sensors LMA1-LMA9 are arranged along the horizontal direction and are positioned next to line sensors LSA1-LSA9, respectively. Then, the monitor sensor LMA1 is disposed adjacent to the center-facing side of line sensor LSA9, and the monitor sensor LMB1 is disposed adjacent to the center-facing side of line-sensor LMB5. Since the quantity of light detected by monitor sensor LMA9 is substantially the same as that detected by line sensor LSA9, an electric charge accumulation period can be accurately adjusted and an overflow of line sensor LSA9 can be prevented. Thus, a phase difference can be precisely detected and an AF adjustment process can be effectively carried out. Also, this arrangement allows many line sensors to be arranged across the entire projected area so that a focus-measurement area can be expanded in accordance with the size of the projected area without modifying the design of the optical image-forming system.

Next, the second embodiment is explained with reference to FIG. 4. The second embodiment is different from the first embodiment in that each monitor sensor is arranged adjacent to the center-facing side of a corresponding line sensor. Since the other constructions are substantially the same as those of the first embodiment, the same numeral references are directly used in the later embodiments.

Figure 4:
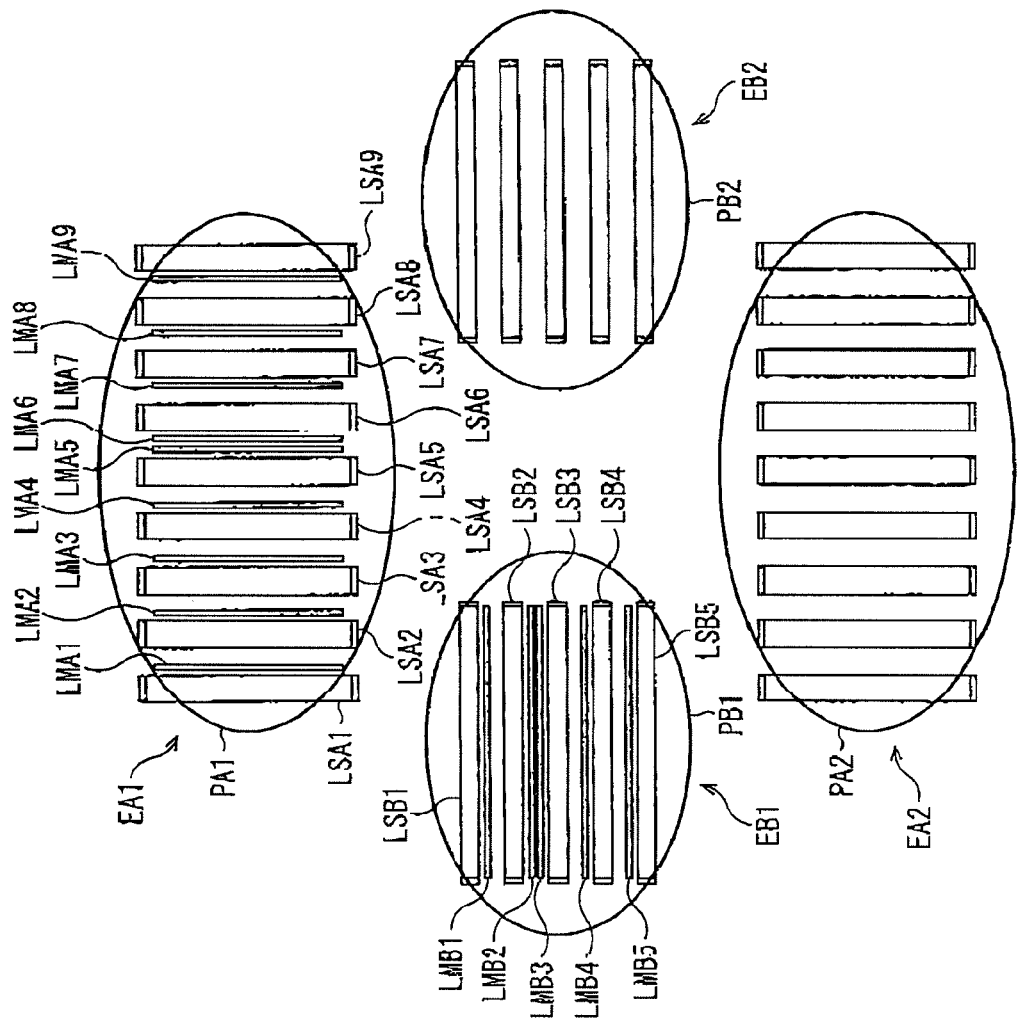
FIG. 4 is a schematic of an arrangement of line-sensors and monitor sensors according to the second embodiment.

FIG. 4 is a schematic arrangement of the line sensors and monitor sensors according to the second embodiment.

Each one of monitor sensors LMA1-LMA4 in line-sensor group EA1 is arranged at the right side, i.e., the center-facing side of its corresponding line sensor. On the other hand, each one of monitor sensors LMA6-LMA9 is arranged at the left side, i.e., the center-facing side of its corresponding line sensor. Each one of monitor sensors LMB1-LMB5 is also arranged at the center-facing side of its corresponding line-sensor.

Since each monitor sensor is positioned closer to the center point of the projected area, a decrease in the projected light due to the optical image-forming system does not influence all of the monitor sensors.

Next, the third embodiment is explained with reference to FIG. 5. The third embodiment is different from the first and second embodiments in that an endmost monitor sensor is arranged on the outer side of its corresponding line sensor, whereas a longitudinal length of the monitor sensor is shorter than that of the other monitor sensors.

Figure 5:
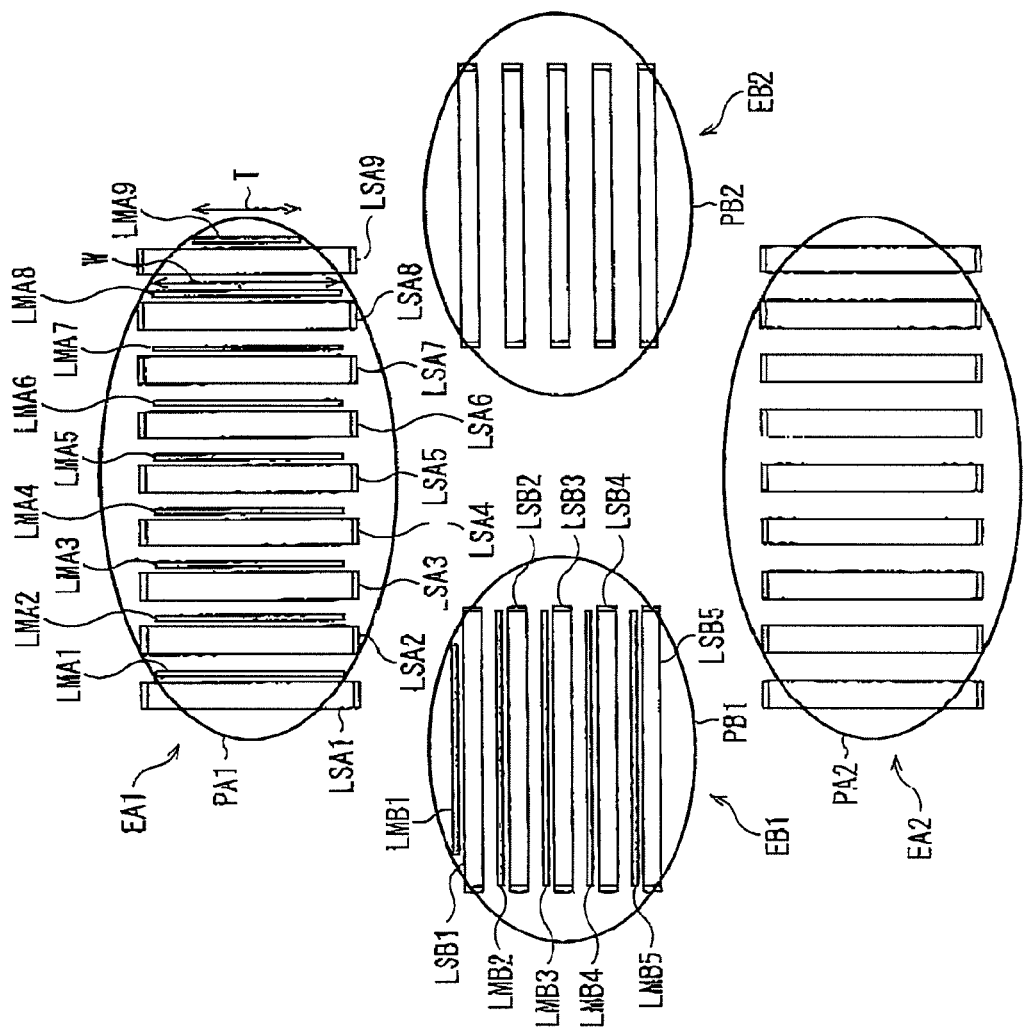
FIG. 5 is a schematic of an arrangement of line-sensors and monitor sensors according to the third embodiment.

FIG. 5 is a schematic arrangement of the line sensors and monitor sensors according to the third embodiment.

Monitor sensor LMA9 is arranged at the right side, namely, at the outer side of line sensor LSA9, similarly to the other monitor sensors LMA1-LMA8. On the other hand, the center position of the monitor sensor LMA9 along the vertical direction is substantially the same as the center position of line sensor LSA9, and the longitudinal length "T" of monitor sensor LMA9 is shorter than the length "W" of the other line sensors LSA1-LSA8. Consequently, the all of monitor sensor LMA9 is within the projected area EP1. Monitor sensor LMB5 is constructed the same as monitor sensor LMA9, so that all of monitor sensor LMB1 is within the projected area EP2. This arrangement allows monitor sensors LMA1 and LMB9 to accurately detect quantities of light entering line sensors LSA1 and LSB9, respectively.

Next, the fourth embodiment is explained with reference to FIG. 6. The fourth embodiment is different from the third embodiment in that the lengths of the monitor sensors are different from each other.

Figure 6:
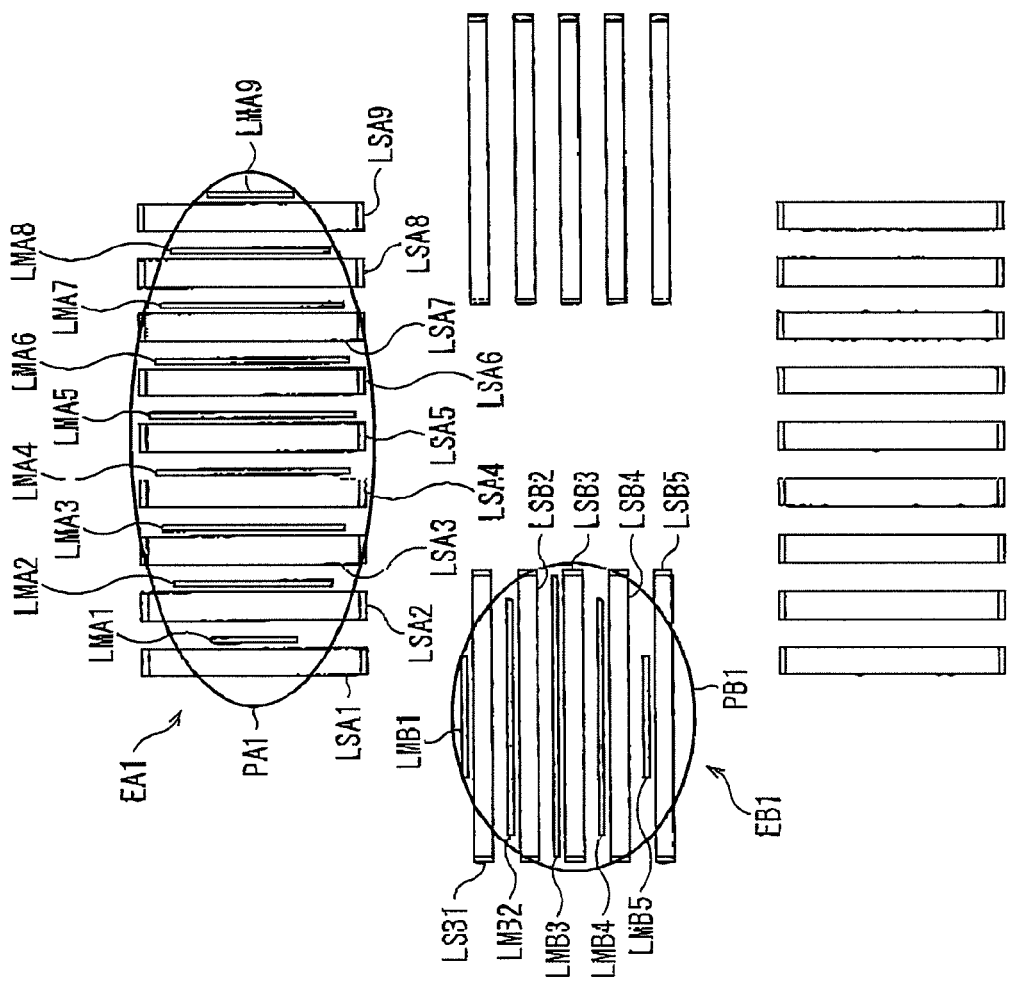
FIG. 6 is a schematic of an arrangement of line-sensors and monitor sensors according to the fourth embodiment.

FIG. 6 is a schematic arrangement of the line sensors and monitor sensors according to the fourth embodiment.

Monitor sensors LMA1-LMA9 have different respective lengths. The length of the monitor sensor LMA5 is the longest, and the other monitor sensors have decreasing lengths the farther their position is from the center point. Also, the lengths of the monitor sensors LMA1 to LMA9 have symmetry with respect to the direction of the sensor-array, namely, left-right direction. Thus, the characteristics of the output image-pixel signals have the symmetry. The lengths of monitor sensors LMB1-LMB5 are also different from one another. Since the edge portion of each monitor sensor is far from the boundary of the projected area, a quantity of light entering the line sensor can be accurately detected.

Next, the fifth embodiment is explained with reference to FIG. 7. In the fifth embodiment, the lengths of the monitor sensors are different as in the fourth embodiment, further, the monitor sensors are arranged at the center-facing sides of the line sensors as in the second embodiment.

Figure 7:
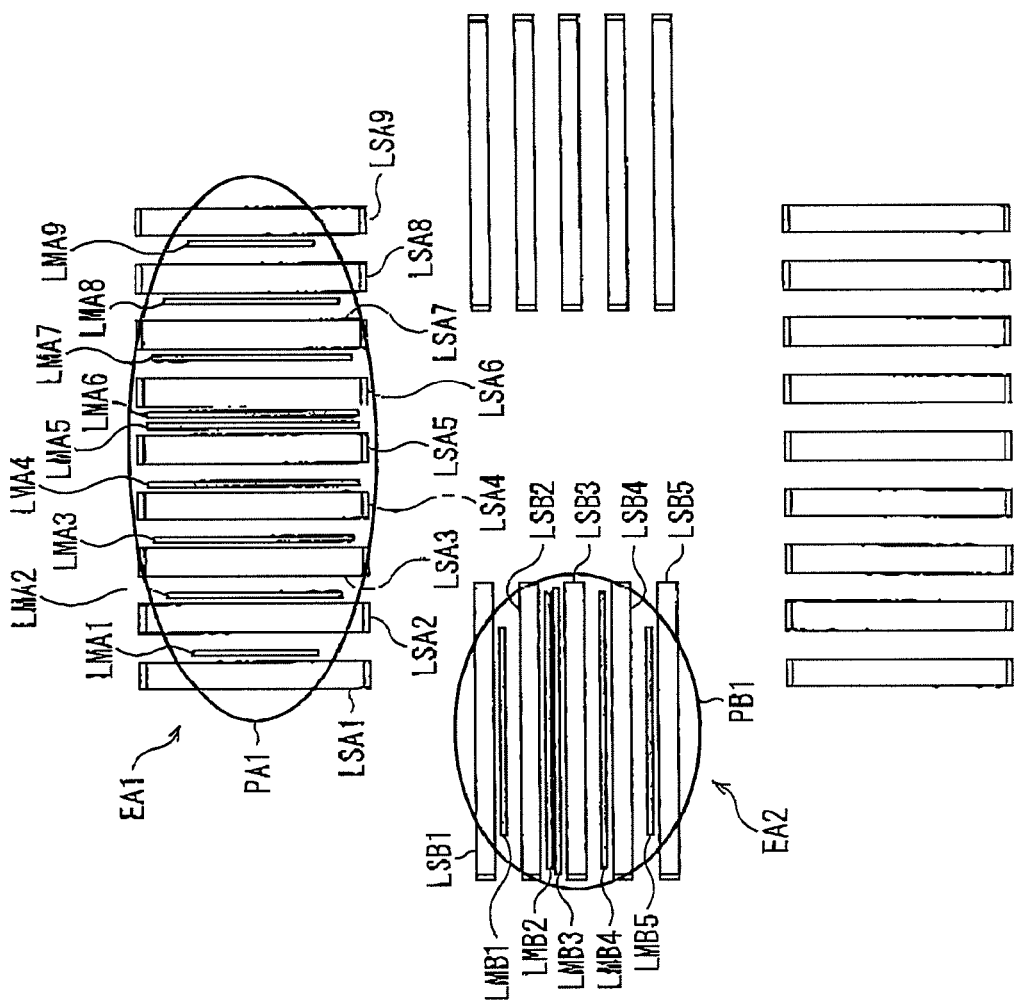
FIG. 7 is a schematic of an arrangement of line-sensors and monitor sensors according to the firth embodiment.

FIG. 7 is a schematic arrangement of the line sensors and monitor sensors according to the fifth embodiment.

Similar to the second embodiment, monitor sensors LMA1-LMA4 and LMA6-LMA9 are arranged at the center-facing sides of line sensors LMA1-LMA4 and LMA6-LMA9, respectively. Furthermore and similar to the fourth embodiment, the lengths of the monitor sensors adjacent to the boundary of the projected area are smaller than those of the monitor sensors arranged at the center portion of the projected area. Monitor sensors LMB1-LMB5 are also arranged in the same manner as monitor sensors LMA1-LMA9.

next, the sixth embodiment is explained with reference to FIG. 8. The sixth embodiment is different from the third embodiment in that two consecutive monitor sensors are adjacent to each other.

FIG. 8 is a schematic arrangement of the line sensors and monitor sensors according to the sixth embodiment.

Monitor sensors LMA1 and LMA2 are adjacent to each other between neighboring line sensors LSA1 and LSA2 with respect to the direction of the line-sensor array. Monitor sensors LMA3 and LMA4, LMA5 and LMA6, LMA7 and LMA8 are also adjacent to each other, similarly to monitor sensors LMA1 and LMA2.

Such arrangements that alternate between having monitor sensors in one section and no monitor sensors in the next section along the direction of the line-sensor array allows the sensitivities of the monitor sensors to improve. As shown in FIG. 2, in the first to fifth embodiments, a vertical shift register is arranged along the side of a line sensor that is opposite from the side where a monitor sensor is arranged (for example, see vertical shift register VSR1 and monitor sensor LMA1 in FIG. 2). Therefore, a logic area for arranging a logic circuit such as a shift register, and a photoelectric conversion area for arranging photodiodes are aligned between two line sensors. The inner construction of the board for the logic area is different from that for the photoelectric conversion area. Therefore, when manufacturing a C-MOS type board, a device-separation area should be provided between the logic area and the photoelectric conversion area.

On the other hand, in the present embodiment two opposite vertical shift registers are arranged in blank sections between neighboring line sensors. Namely, the logic area and the photoelectric conversion area are aligned alternately between line sensors. Consequently, a device-separation area is not needed. Thus, the photoelectric conversion area can be expanded to enhance sensitivities of photodiodes. Furthermore, these arrangements allow for the manufacturing of an AF module chip to be completed with ease.

Note that, in FIG. 9, the size of monitor sensors LMA9 and LMB1 is smaller than that of the other monitors, however, if the size of the projected area is sufficiently large, the size of the endmost monitor sensors LMA9 and LMB1 may be set to a length that is the same as the length of the other monitor sensors.

As for the focus-measurement method, either multiple focal-point measurement or center focal-point measurement may be applied. The number of line sensors and monitor sensors, or the number of line-sensor groups may be optionally set in accordance with the size and outline of the projected area. The AF module may be installed in another device with a photographing function, such as a cellular phone.

Finally, it will be understood by those skilled in the arts that the foregoing description is of preferred embodiments of the device, and that various changes and modifications may be made to the present invention without departing from the spirit and scope thereof.

The present disclosure relates to subject matter contained in Japanese Patent Application No. 2009-150890 (filed on Jun. 25, 2009), which is expressly incorporated herein by reference, in its entirety.

What is claimed is:

1. An apparatus for detecting a focus state, comprising:
    an optical image-forming system that forms an object image;
    a plurality of line sensors that are arranged on a projected area of the optical image-forming system;
    a plurality of monitor sensors that are arranged on the projected area along a direction of a line-sensor array, each monitor sensor being adjacent to a corresponding line sensor and monitoring a quantity of light incident on the corresponding line sensor; and
    a signal processor that outputs image-pixel signals corresponding to the object image based on electric charges accumulated in said plurality of line sensors, wherein
    endmost monitor sensors corresponding to endmost line sensors disposed at opposite ends of the projected area are arranged along an inner side of each of the endmost line sensors in a direction towards a center portion of the projected area.

2. The apparatus of claim 1, wherein more than one monitor sensor is arranged along the inner side of their corresponding line sensors in the direction towards the center portion of the projected area.

3. The apparatus of claim 1, wherein a size of the endmost monitor sensor is smaller than a size of a center monitor sensor positioned at the center portion of the projected area.

4. The apparatus of claim 1, wherein as a distance from the center portion of the projected area increases, a size of said plurality of monitor sensors decreases.

5. The apparatus of claim 1, wherein said plurality of monitor sensors are adjacent to each other between neighboring line sensors on an alternating basis with respect to the direction of the line-sensor array.

6. The apparatus of claim 1, wherein said plurality of line sensors comprises at least one pair of line-sensor groups, said optical image-forming system projecting the object image to each line-sensor group.

7. The apparatus of claim 1, wherein the apparatus is installed in a camera.

8. An apparatus for detecting a focus state, comprising:
    an optical image-forming system that forms an object image;
    a plurality of line sensors that are arranged on a projected area of the optical image-forming system;
    a plurality of monitor sensors that are arranged on the projected area along a direction of a line-sensor array, each monitor sensor being adjacent to a corresponding line sensor and monitoring an amount of light incident on the corresponding line sensor; and
    a signal output processor that outputs image-pixel signals corresponding to the object image based on electric charges accumulated in said plurality of line sensors, wherein
    at least an endmost monitor sensor corresponding to an endmost line-sensor has a size smaller than a monitor sensor positioned at a central portion of the projected area.

9. An apparatus for detecting a focus state, comprising:
    an optical image-forming system that forms an object image;
    a plurality of line sensors that are arranged on a projected area of the optical image-forming system;
    a plurality of monitor sensors that are arranged on the projected area along a direction of a line-sensor array, each monitor sensor being adjacent to a corresponding line sensor and monitoring a quantity of light incident on the corresponding line sensor; and a signal processor that outputs image-pixel signals corresponding to the object image based on electric charges accumulated in said plurality of line sensors, wherein at least an endmost monitor sensor corresponding to an endmost line sensor is arranged along a center-facing side of the endmost line sensor in a direction towards a center portion of the projected area, and wherein a size of the endmost monitor sensor is smaller than a size of a center monitor sensor positioned at the center portion of the projected area.

10. The apparatus of claim 9, wherein more than one monitor sensor is arranged along the center-facing sides of their corresponding line sensors in the direction towards the center portion of the projected area.

11. The apparatus of claim 9, wherein as a distance from the center portion of the projected area increases, a size of said plurality of monitor sensors decreases.

12. The apparatus of claim 9, wherein said plurality of monitor sensors are adjacent to each other between neighboring line sensors on an alternating basis with respect to the direction of the line-sensor array.

13. The apparatus of claim 9, wherein said plurality of line sensors comprises at least one pair of line-sensor groups, said optical image-forming system projecting the object image to each line-sensor group.

14. The apparatus of claim 9, wherein the apparatus is installed in a camera.

15. An apparatus for detecting a focus state, comprising:
an optical image-forming system that forms an object image;
a plurality of line sensors that are arranged on a projected area of the optical image-forming system;
a plurality of monitor sensors that are arranged on the projected area along a direction of a line-sensor array, each monitor sensor being adjacent to a corresponding line sensor and monitoring a quantity of light incident on the corresponding line sensor; and
a signal processor that outputs image-pixel signals corresponding to the object image based on electric charges accumulated in said plurality of line sensors, wherein at least an endmost monitor sensor corresponding to an endmost line sensor is arranged along a center-facing side of the endmost line sensor in a direction towards a center portion of the projected area, and wherein as a distance from the center portion of the projected area increases, a size of said plurality of monitor sensors decreases.

16. The apparatus of claim 15, wherein more than one monitor sensor is arranged along the center-facing sides of their corresponding line sensors in the direction towards the center portion of the projected area.

17. The apparatus of claim 15, wherein a size of the endmost monitor sensor is smaller than a size of a center monitor sensor positioned at the center portion of the projected area.

18. The apparatus of claim 15, wherein said plurality of monitor sensors are adjacent to each other between neighboring line sensors on an alternating basis with respect to the direction of the line-sensor array.

19. The apparatus of claim 15, wherein said plurality of line sensors comprises at least one pair of line-sensor groups, said optical image-forming system projecting the object image to each line-sensor group.

20. The apparatus of claim 15, wherein the apparatus is installed in a camera.

* * * * *